United States Patent
Ihsl

(10) Patent No.: US 11,326,453 B2
(45) Date of Patent: May 10, 2022

(54) DISPLACEMENT EXPANDING APPARATUS AND ENGINE INCLUDING THE SAME

(71) Applicant: Lucas Ihsl, Beltsville, MD (US)

(72) Inventor: Lucas Ihsl, Beltsville, MD (US)

( * ) Notice: Subject to any disclaimer, the term of this patent is extended or adjusted under 35 U.S.C. 154(b) by 137 days.

(21) Appl. No.: 16/820,726

(22) Filed: Mar. 17, 2020

(65) Prior Publication Data
US 2021/0293146 A1   Sep. 23, 2021

(51) Int. Cl.
| F01C 21/08 | (2006.01) |
| F15B 15/04 | (2006.01) |
| F01D 15/08 | (2006.01) |
| F15B 9/02 | (2006.01) |
| F15B 20/00 | (2006.01) |
| F16H 19/02 | (2006.01) |
| F01C 1/344 | (2006.01) |
| F04C 18/344 | (2006.01) |

(52) U.S. Cl.
CPC ...... *F01C 21/0836* (2013.01); *F01C 21/0881* (2013.01); *F16H 19/02* (2013.01); *F01C 1/3446* (2013.01); *F04C 18/3441* (2013.01); *F04C 2240/20* (2013.01); *F04C 2240/30* (2013.01)

(58) Field of Classification Search
CPC .. F01C 21/0836; F01C 21/0881; F15B 15/04; F15B 9/02; F15B 20/00; F01D 15/08; F16H 19/02
USPC .......................................................... 94/401
See application file for complete search history.

(56) References Cited

U.S. PATENT DOCUMENTS

| 3,195,575 | A | * | 7/1965 | Sheppard | ............... | B62D 5/087 |
| | | | | | | 137/625.69 |
| 3,320,822 | A | | 5/1967 | Tatom | | |
| 3,896,703 | A | * | 7/1975 | Bertanza | ............... | B62D 5/061 |
| | | | | | | 91/401 |
| 5,803,201 | A | * | 9/1998 | Sheppard | ............... | B62D 5/061 |
| | | | | | | 180/417 |
| 7,592,740 | B2 | | 9/2009 | Roe | | |
| 2015/0107237 | A1 | | 4/2015 | Ihsl | | |

FOREIGN PATENT DOCUMENTS

FR           1003296 A       3/1952

OTHER PUBLICATIONS

European search report for Application No. 20163729.5 dated Aug. 29, 2020.

* cited by examiner

*Primary Examiner* — Deming Wan
(74) *Attorney, Agent, or Firm* — McLean IP Global; Jason Y. Pahng

(57) ABSTRACT

Provided are: a displacement expanding apparatus, which uses environmentally friendly electrical energy to generate rotational power; and an engine including the displacement expanding apparatus, the novel engine having improved performance and a long lifespan. Also, to realize a novel engine, provided is a novel engine which is environmentally friendly and has a long lifespan.

15 Claims, 15 Drawing Sheets

DISPLACEMENT EXPANDING APPARATUS AND ENGINE INCLUDING THE SAME

BACKGROUND

1. Field

One or more embodiments relate to a displacement expanding apparatus and an engine including the same and, more specifically, to a displacement expanding apparatus and an engine including the same, in which a vibration of a vibrator in one direction is transformed into reciprocating rotation and then transformed into a vibration in one direction, thereby expanding vibration displacement.

2. Description of the Related Art

Power (torque) required to operate vehicles, and various other machines and mechanisms, is usually obtained by burning fossil fuels. However, when fossil fuels are burnt, a large amount of carbon dioxide is released, and various harmful substances other than carbon dioxide are produced. Thus, combustion of fossil fuels is the main cause of environmental pollution. In addition, there is a limited amount of fossil fuels such as crude oil or coal on the earth, and thus it is widely known that there is a limit to the dependence on fossil fuels. Accordingly, mankind has made efforts to find new energy sources and conducted much research for finding ways to efficiently use existing energy sources.

Achievements of such research so far include a method of generating electrical energy by charging batteries to obtain power for vehicles or other machines, and a hybrid method of using both combustion of existing fossil fuels and batteries. However, power generation devices (engines) using electrical energy so far have had limited performance. Thus, there is a need for research on a new power generation device which does not generate carbon dioxide and has improved performance and a long lifespan while using environmentally friendly electrical energy.

SUMMARY

One or more embodiments include an engine that generates torque by using environmentally friendly electrical energy and has improved performance and a long lifespan.

One or more embodiments include: a displacement expanding apparatus, which may amplify the amplitude of vibration of a ceramic vibrator in one direction or a mechanical vibrator; and an engine including the same, which is environmentally friendly and has a long lifespan while providing large power.

Additional aspects will be set forth in part in the description which follows and, in part, will be apparent from the description, or may be learned by practice of the presented embodiments of the disclosure.

According to one or more embodiments, a displacement expanding apparatus includes: a master unit reciprocatingly rotating within a central angle of a certain magnitude with respect to a main central axis; and a forward and backward reciprocating unit located laterally to the outside of the master unit, at least a portion of the forward and backward reciprocating unit receiving the reciprocating rotation of the master unit and linearly reciprocating in forward and backward directions, wherein the master unit includes: a swell tube extending in the forward and backward directions with respect to the main central axis and including a cavity having the same central axis as the main central axis; a swell rotor extending in the forward and backward directions with respect to the main central axis, at least a portion of the swell rotor being mounted within the cavity; an elastic ball mounted within the cavity and located between the swell tube and the swell rotor; an elastic panel member mounted within the cavity, located between the swell tube and the swell rotor, and located on a side portion of the elastic ball in a circumferential direction of the swell rotor; a disc plate arranged behind the swell tube and the swell rotor, wherein the disc plate vibrates in the forward and backward directions due to external vibration, thereby causing elastic deformation of the elastic panel member; and a lift cam panel arranged in front of the swell tube and the swell rotor and reciprocatingly rotating within a central angle of a certain magnitude with respect to the main central axis, wherein the forward and backward reciprocating unit includes: a ball unit of which at least a portion is in contact with the lift cam panel; and a pushing cylinder of which at least a portion is in normally in compressive and close contact with the ball unit, wherein at least a portion of the ball unit is reciprocated in a radial direction of the lift cam panel by reciprocating rotation of the lift cam panel, and at least another portion of the ball unit is reciprocated in the forward and backward directions, wherein the pushing cylinder is linearly reciprocated in the forward and backward directions by linear forward and backward reciprocation of the ball unit, wherein the swell tube comprises a first protruding vane provided on an inner circumferential surface in the radial direction, protruding inward in the radial direction, and extending in the forward and backward directions, wherein the swell rotor comprises a second protruding vane provided on an outer circumference in the radial direction, protruding outward in the radial direction, and extending in the forward and backward directions, wherein the elastic panel member is deformed by the vibration of the disc plate, wherein the elastic panel member is elastically deformed and restored in the circumferential direction of the swell rotor between the first protruding vane and the second protruding vane to change a distance between the first protruding vane and the second protruding vane.

In an embodiment, the elastic panel member may include a plurality of flat spring members stacked in a direction between the first protruding vane and the second protruding vane and applies an elastic force between the first protruding vane and the second protruding vane.

In an embodiment, the lift cam panel may include a plurality of lifting grooves defined in an outer circumferential surface of the lift cam panel in the radial direction and having a certain depth in the radial direction.

In an embodiment, the ball unit may further include: a lift ball located in contact with the outer circumferential surface of the lift cam panel in the radial direction; and a shift ball located further outward than the lift ball in the radial direction of the lift cam panel, wherein the pushing cylinder has: a rear pushing surface in contact with the shift ball, at least portion of the rear pushing surface being located in front of the shift ball; and a front pushing surface located in front of the rear pushing surface, wherein the lift ball is located at a first position when located within each of the lifting grooves of the lift cam panel and is located at a second position when separated from each of the lifting grooves of the lift cam panel, wherein the second position is a position located further outward than the first position in the radial direction of the lift cam panel, and the lift ball reciprocates in the radial direction of the lift cam panel as the lift cam panel reciprocatingly rotates, wherein the shift ball is pushed by the lift ball and displaced forward when the lift ball is located at the second position, thereby pushing forward the rear pushing surface of the pushing cylinder, and the pushing cylinder is pushed forward by the shift ball and displaced.

In an embodiment, between the lift ball and the shift ball, an intermediate ball may be provided, the intermediate ball being bigger than the lift ball and located further outward than the lift ball in the radial direction of the lift cam panel.

In an embodiment, the apparatus may further include a rotation unit, wherein the rotation unit includes: a rotor shaft sharing a central rotation axis with the main central axis; a main rotor which is connected to the rotor shaft and rotates; and a sliding module provided on an outer circumferential surface of the main rotor, wherein the main rotor has a module mounting groove which is defined in the outer circumferential surface of the main rotor, open rearward, and inclined relative to the main central axis, wherein the sliding module includes: a first rotor driving ball located at a front end of the module mounting groove; an elastic spring located behind the first rotor driving ball; and a second rotor driving ball located behind the elastic spring, wherein the second rotor driving ball is pushed forward by the front pushing surface of the pushing cylinder and pushed rearward by the elastic spring, thereby reciprocatingly displacing within the module mounting groove.

According to one or more embodiments, an engine including a displacement expanding apparatus includes: a casing having a main central axis that extends in one direction and having a mounting space therein; a vibration unit mounted within the casing, located at a rear end of the casing, and including a vibrator configured to generate vibration that reciprocates in forward and backward directions; a master unit mounted within the casing, positioned at a front end of the vibration unit, and receiving the vibration generated in the vibration unit, at least a portion of the master unit reciprocatingly rotating within a central angle of a certain magnitude with respect to the main central axis; a forward and backward reciprocating unit mounted within the casing and located outside the master unit in a radial direction of the casing, at least a portion of the forward and backward reciprocating unit receiving the reciprocating rotation of the master unit and linearly reciprocating in forward and backward directions; and a rotation unit mounted within the casing and located at a front end of the casing, at least a portion of the rotation unit receiving the linear forward and backward reciprocation of the forward and backward reciprocating unit and rotating with respect to the main central axis, wherein the master unit includes a lift cam panel reciprocatingly rotating within a central angle of a certain magnitude with respect to the main central axis, wherein the forward and backward reciprocating unit includes: a ball unit of which at least a portion is reciprocated in the radial direction of the casing by the lift cam panel, at least a portion of the ball unit reciprocating in the forward and backward directions; and a pushing cylinder linearly reciprocating in the forward and backward directions, at least a portion of the pushing cylinder being in contact with the ball unit, wherein the rotation unit includes: a main rotor; and a sliding module of which at least a portion is displaced forward by the pushing cylinder to push the main rotor.

In an embodiment, the vibration unit may include: a vibration ball located in front of the vibrator; and a disc plate located in front of the vibration ball and reciprocated in the forward and backward directions by the vibration ball.

In an embodiment, the master unit may include: a swell tube extending in the forward and backward directions with respect to the main central axis and including a cavity having the same central axis as the main central axis; a swell rotor extending in the forward and backward directions with respect to the main central axis, at least a portion of the swell rotor being mounted within the cavity; an elastic ball mounted within the cavity and located between the swell tube and the swell rotor; and an elastic panel member mounted within the cavity, located between the swell tube and the swell rotor, and located outside the elastic ball, wherein the swell tube includes a first protruding vane provided on an inner circumferential surface in a radial direction, protruding inward in the radial direction, and extending in the forward and backward directions, wherein the swell rotor includes a second protruding vane provided on an outer circumference in the radial direction, protruding outward in the radial direction, and extending in the forward and backward directions, wherein the elastic ball and the elastic panel member are located between the first protruding vane and the second protruding vane, wherein the disc plate is located at a rear end of the elastic panel member and applies vibration to the elastic panel member in the forward and backward directions to elastically deform the elastic panel member, wherein the elastic panel member is elastically deformed and restored in a circumferential direction of the swell rotor between the first protruding vane and the second protruding vane to change a distance between the first protruding vane and the second protruding vane, wherein the lift cam panel is connected to a front end of the swell rotor and integrally constituted with the swell rotor.

In an embodiment, the elastic panel member may include a plurality of flat spring members stacked in a direction between the first protruding vane and the second protruding vane and applies an elastic force between the first protruding vane and the second protruding vane.

In an embodiment, the lift cam panel may include a plurality of lifting grooves defined in an outer circumferential surface in the radial direction and having a certain depth in the radial direction.

In an embodiment, the ball unit further may include: a lift ball located in contact with the outer circumferential surface of the lift cam panel in the radial direction; and a shift ball located further outward than the lift ball in the radial direction of the casing, wherein the pushing cylinder has: a rear pushing surface in contact with the shift ball, at least portion of the rear pushing surface being located in front of the shift ball; and a front pushing surface located in front of the rear pushing surface, wherein the lift ball is located at a first position when located within each of the lifting grooves of the lift cam panel and is located at a second position when separated from each of the lifting grooves of the lift cam panel, wherein the second position is a position located further outward than the first position in the radial direction of the casing, and the lift ball reciprocates in the radial direction of the casing as the lift cam panel reciprocatingly rotates, wherein the shift ball is pushed by the lift ball and displaced forward when the lift ball is located at the second position, thereby pushing forward the rear pushing surface of the pushing cylinder, and the pushing cylinder is pushed forward by the shift ball and displaced.

In an embodiment, between the lift ball and the shift ball, an intermediate ball may be provided, the intermediate ball being located further outward than the lift ball in the radial direction of the casing.

In an embodiment, the rotation unit may include: a rotor shaft sharing a central rotation axis with the main central axis; a main rotor which is connected to the rotor shaft and rotates; and a sliding module provided on an outer circumferential surface of the main rotor, wherein the main rotor has a module mounting groove which is defined in the outer circumferential surface of the main rotor, open rearward, and inclined relative to the main central axis, wherein the sliding module includes: a first rotor driving ball located at a front end of the module mounting groove; an elastic spring located behind the first rotor driving ball; and a second rotor driving ball located behind the elastic spring, wherein the second rotor driving ball is pushed forward by the front pushing surface of the pushing cylinder and pushed rearward by the elastic spring, thereby reciprocatingly displacing within the module mounting groove.

In an embodiment, within the casing, a cooling oil chamber may be provided, the cooling oil chamber being filled with cooling insulating oil.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
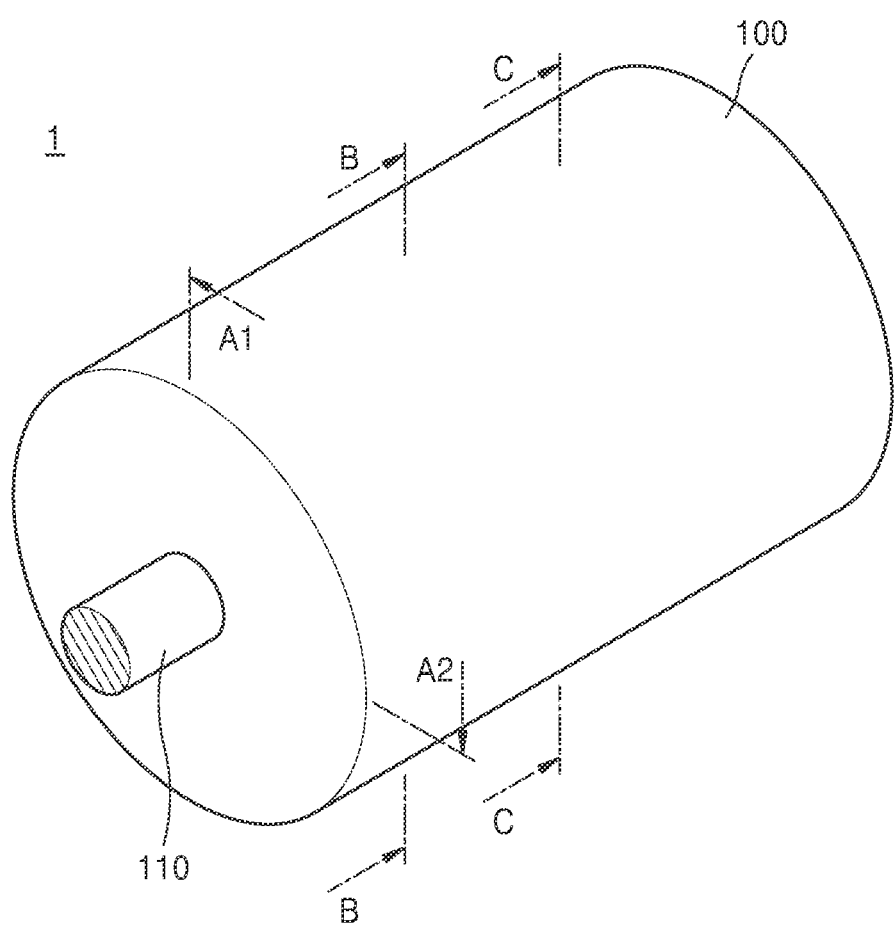
FIG. 1 is a perspective view illustrating the exterior of an engine including a displacement expanding apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In an embodiment, a displacement expanding apparatus is referred to as portions including a master unit and a forward and backward reciprocating unit, and the displacement expanding apparatus is a device having a function of expanding displacement of vibration of a vibrator in one direction that is included in a vibration unit.

Hereinafter, embodiments will be described in detail with reference to the accompanying drawings.

Figure 2:
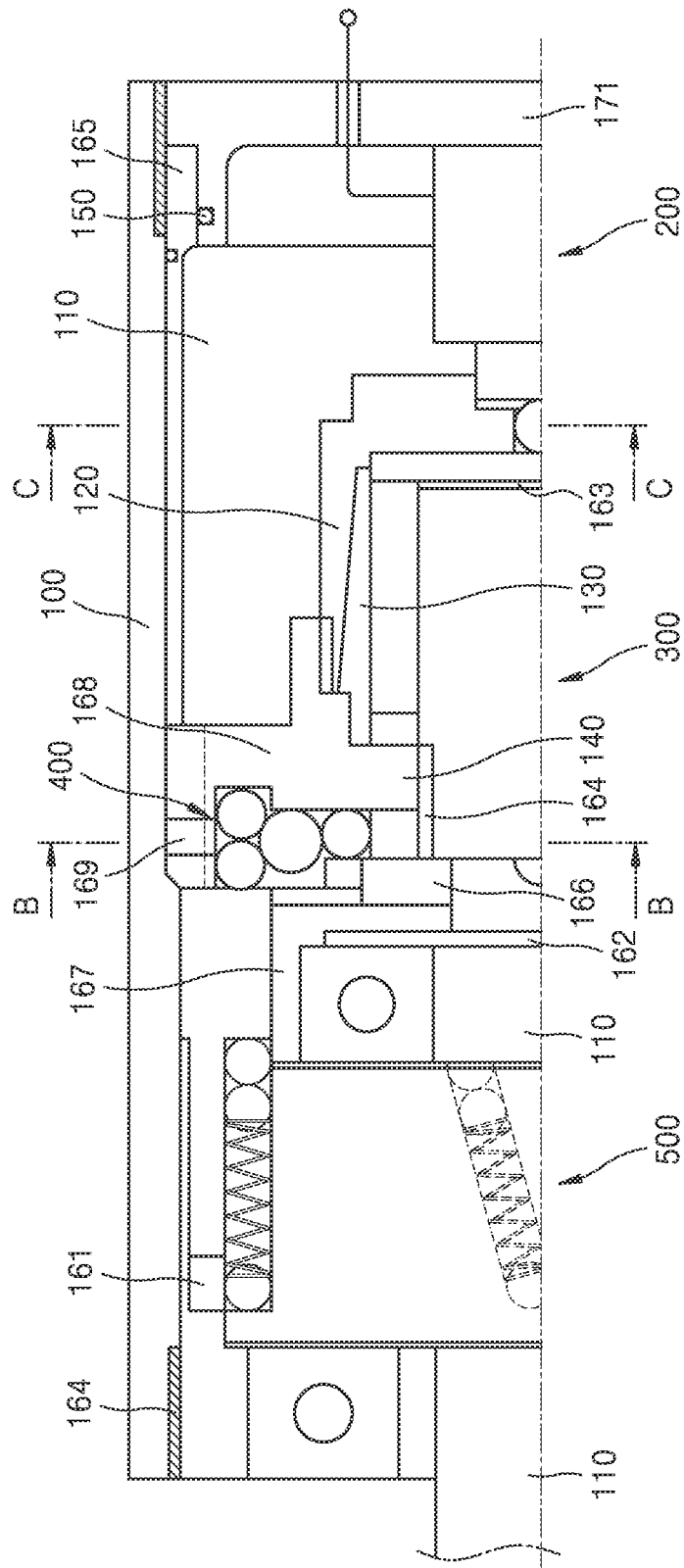
FIG. 2 is a cross-sectional view of the engine including the displacement expanding apparatus, taken along line A1 or A2 of FIG. 1.
Figure 3:
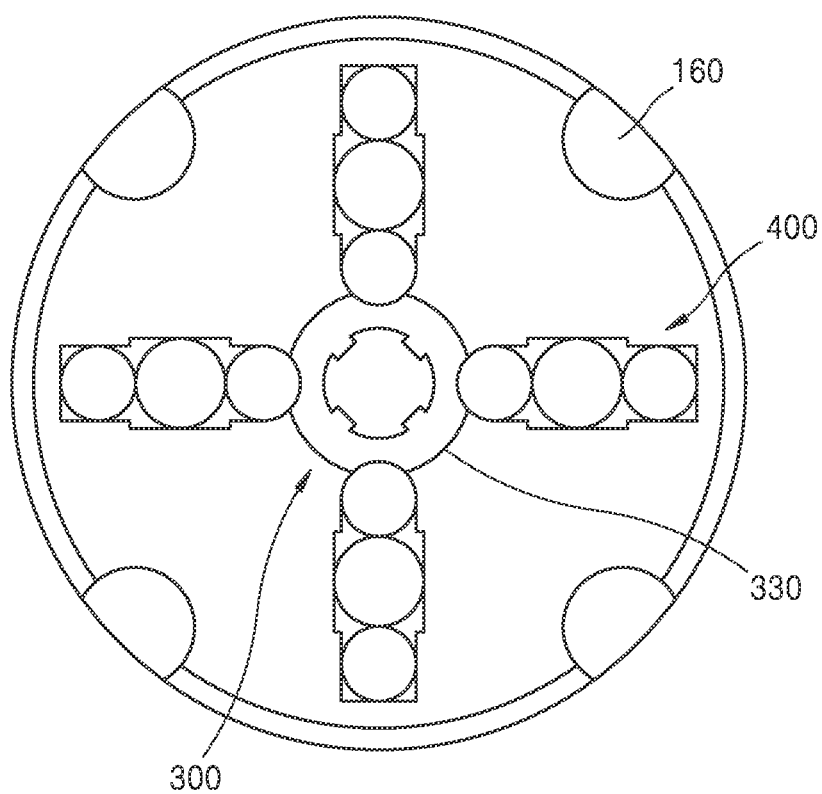
FIG. 3 is a cross-sectional view taken along line B-B' of FIG. 1 or FIG. 2.
Figure 4:
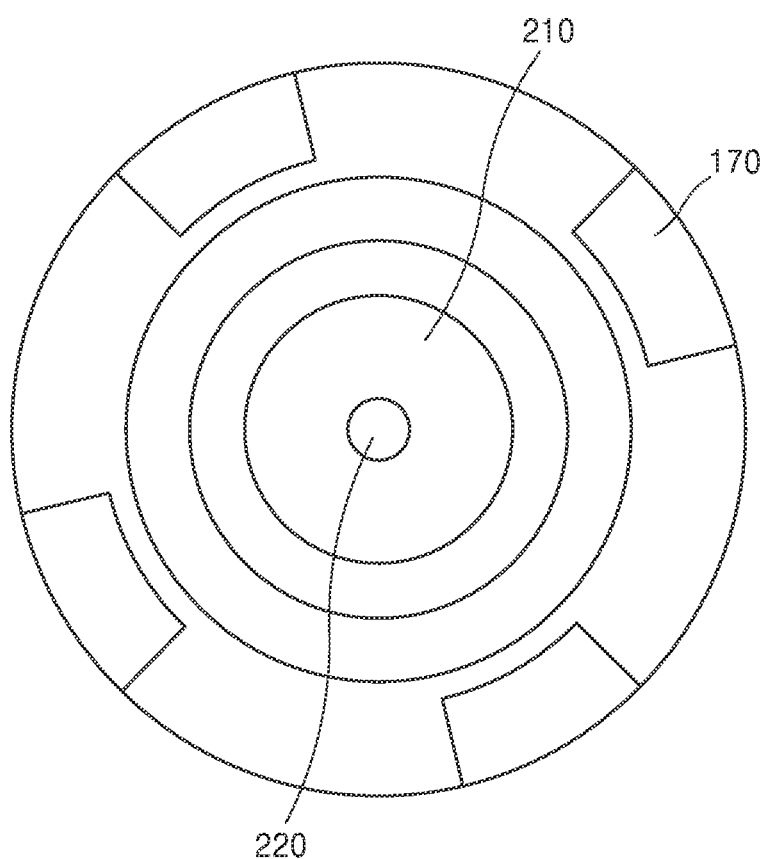
FIG. 4 is a cross-sectional view taken along line C-C' of FIG. 1 or FIG. 2.

FIG. 1 is a perspective view illustrating the exterior of an engine 1 including a displacement expanding apparatus according to an embodiment. FIG. 2 is a cross-sectional view of the engine 1 including the displacement expanding apparatus, taken along line A1 or A2 of FIG. 1. FIG. 3 is a cross-sectional view taken along line B-B' of FIG. 1 or FIG. 2. FIG. 4 is a cross-sectional view taken along line C-C' of FIG. 1 or FIG. 2.

The engine 1, including the displacement expanding apparatus according to an embodiment, includes: a casing 100 having a main central axis Ce that extends in one direction and having a mounting space therein; a vibration unit 200 mounted within the casing 100, located at a rear end of the casing 100, and including a vibrator 210 which receives power from the outside and generates vibration that reciprocates in forward and backward directions; a master unit 300 mounted within the casing 100, positioned at a front end of the vibration unit 200, and receiving the vibration generated in the vibration unit 200, at least a portion of the master unit 300 reciprocatingly rotating within a central angle of a certain magnitude with respect to the main central axis Ce; a forward and backward reciprocating unit 400 mounted within the casing 100 and located outside the master unit 300 in a radial direction, receiving the reciprocating rotation of the master unit 300, and linearly reciprocating in forward and backward directions; and a rotation unit 500 mounted within the casing 100, located at a front end of the casing 100, and rotating with respect to the main central axis Ce due to the linear forward and backward reciprocation of the forward and backward reciprocating unit 400.

Here, the master unit 300 includes a lift cam panel 330 reciprocatingly rotating within a central angle of a certain magnitude with respect to the main central axis Ce, and at least some portions of the lift cam panel 330 have diameters different from those of other portions. The forward and backward reciprocating unit 400 includes a pushing cylinder 430 that linearly reciprocates in the forward and backward directions. The rotation unit 500 includes a main rotor 520.

Here, the master unit 300 and the forward and backward reciprocating unit 400 may constitute one displacement expanding apparatus.

Hereinafter, the displacement expanding apparatus according to an embodiment and the engine including the displacement expanding apparatus will be described.

First, the casing 100 will be described.

The casing 100 constitutes the exterior and frame of the engine 1 including the displacement expanding apparatus according to an embodiment. The casing 100 has the main central axis Ce extending in one direction and has a mounting space therein.

All of the vibration unit 200, the master unit 300, the forward and backward reciprocating unit 400, and the rotation unit 500 are mounted within the mounting space of the casing 100.

Also, referring to FIG. 3, the forward and backward reciprocating unit 400 may be arranged in each of four directions (up, down, left, and right) around the main central axis Ce of the casing 100, when viewed in the forward and backward directions. However, an embodiment is not limited thereto.

Also, referring to FIG. 4, the vibration unit 200 may be arranged in a central portion so that the main central axis Ce passes therethrough, when viewed in the forward and backward directions. However, an embodiment is not limited thereto.

Also, a cooling oil chamber 110 may be provided within the casing 100.

Cooling insulating oil may be stored within the cooling oil chamber. The cooling oil may remove heat generated from each of the units while the engine 1 including the displacement expanding apparatus is operated.

Also, fixing units may be provided within the casing 100 so that the vibration unit 200, the master unit 300, the forward and backward reciprocating unit 400, and the rotation unit 500, which will be described later, are fixed and operated at the respective right positions. For example, a cone holder 120, a sank 130, a neck disc 140, a sleeve, a flange, a bearing, and a bearing housing may be provided.

Also, various chambers for storing various fluids (cooling oil, insulating oil, or the like) within the casing 100 and preventing the fluids from being leaked to the outside, a seal member 150, and a flow passage through which the fluids flow may be provided.

For example, a horizontal flow passage 160 and a rotation passage (170), which are connected to the cooling oil chamber 110 and enable the insulating oil to flow, may be provided in the outside of the casing 100.

Also, spaces or gaps 161, 162, and 163 between members may be provided in the casing 100. Also, a spline screw 164 and various holder sleeves 165 for connecting the members may be provided. Also, a ball sheet 166, a bearing housing 167, a unit housing 168, or the like may be provided. Also, regions to be gripped by pliers when fixing various members such as holders may be provided. Also, a vertical passage 169 through which the insulating oil flows may be provided. Also, a cover cap 171 may be provided.

Hereinafter, the configuration of the vibration unit 200 and the operation of the vibration unit 200 will be described.

The vibration unit 200 is mounted within the casing 100 and located at a rear end of the casing 100.

The vibration unit 200 includes a vibrator 210, a vibration ball 220. and a disc plate 230.

The vibrator 210 is arranged at a rear end of the engine 1 including the displacement expanding apparatus. The vibrator 210 is a member that has a length variable in the longitudinal direction of the engine 1 including the displacement expanding apparatus. Thus, the vibrator 210 may generate forward and backward vibration. Either a ceramic vibrator or a mechanical vibrator may be used as the vibrator 210, and the vibrator 210 may be made of a piezoelectric element having a ceramic material. When made of the piezoelectric element, the vibrator 210 is formed having a stack shape in which piezoelectric elements are stacked.

Here, an operation module (not shown) including a secondary battery as a driving power source may be further provided, which applies an operation signal to the vibrator 210, operates the engine 1 including the displacement expanding apparatus, and adjusts rotation speed and torque of the engine 1 including the displacement expanding apparatus.

The vibrator 210 may be operated when receiving a signal (and/or power) from the outside. The vibrator 210 may be connected to an external controller P.

The vibrator 210 includes a head 212, and the head 212 may be provided at a distal end of the vibrator 210. Thus, the head 212 may protrude forward from the vibrator 210.

The vibration ball 220 may be located in front of the vibrator 210. The vibration ball 220 may be reciprocated in the forward and backward directions by the vibrator 210. The vibration ball 220 may be made of an elastic material, but an embodiment is not limited thereto.

Figure 5:
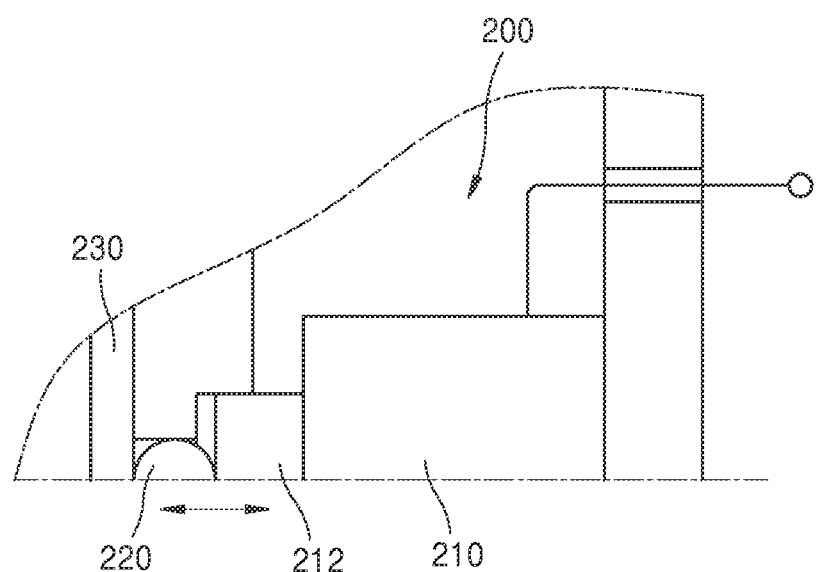
FIG. 5 is a partially enlarged cross-sectional view illustrating a structure of a vibration unit of the engine including the displacement expanding apparatus according to an embodiment.

The disc plate 230 may be located in front of the vibration ball 220. At least a portion of the disc plate 230 may be moved in the forward and backward directions by the vibration ball 220. That is, the entirety of the disc plate 230 may be reciprocated in the forward and backward directions. Alternatively, at least a portion thereof may be deformed and reciprocated in the forward and backward directions. That is, the reciprocation in the forward and backward directions described as an arrow O of FIG. 5 may be possible.

The disc plate 230 is a member for transmitting the vibration of the vibrator 210 to the master unit 300 which will be described later. It is described in the description that the disc plate 230 is included in the vibration unit 200, but an embodiment is not limited thereto. That is, it may be understood that the disc plate 230 is included in the master unit 300, and the disc plate 230 is provided at the rear end of the master unit 300.

When the vibrator 210 receives the external power and generates reciprocating vibration in the forward and backward directions, the vibration may be transmitted to the disc plate 230 through the vibration ball 220. Thus, the entirety of the disc plate 230 may be reciprocated in the forward and backward directions. Alternatively, at least a portion thereof may be deformed and reciprocated in the forward and backward directions. The vibration ball 220 may amplify the vibration of the vibrator 210.

Figure 6:
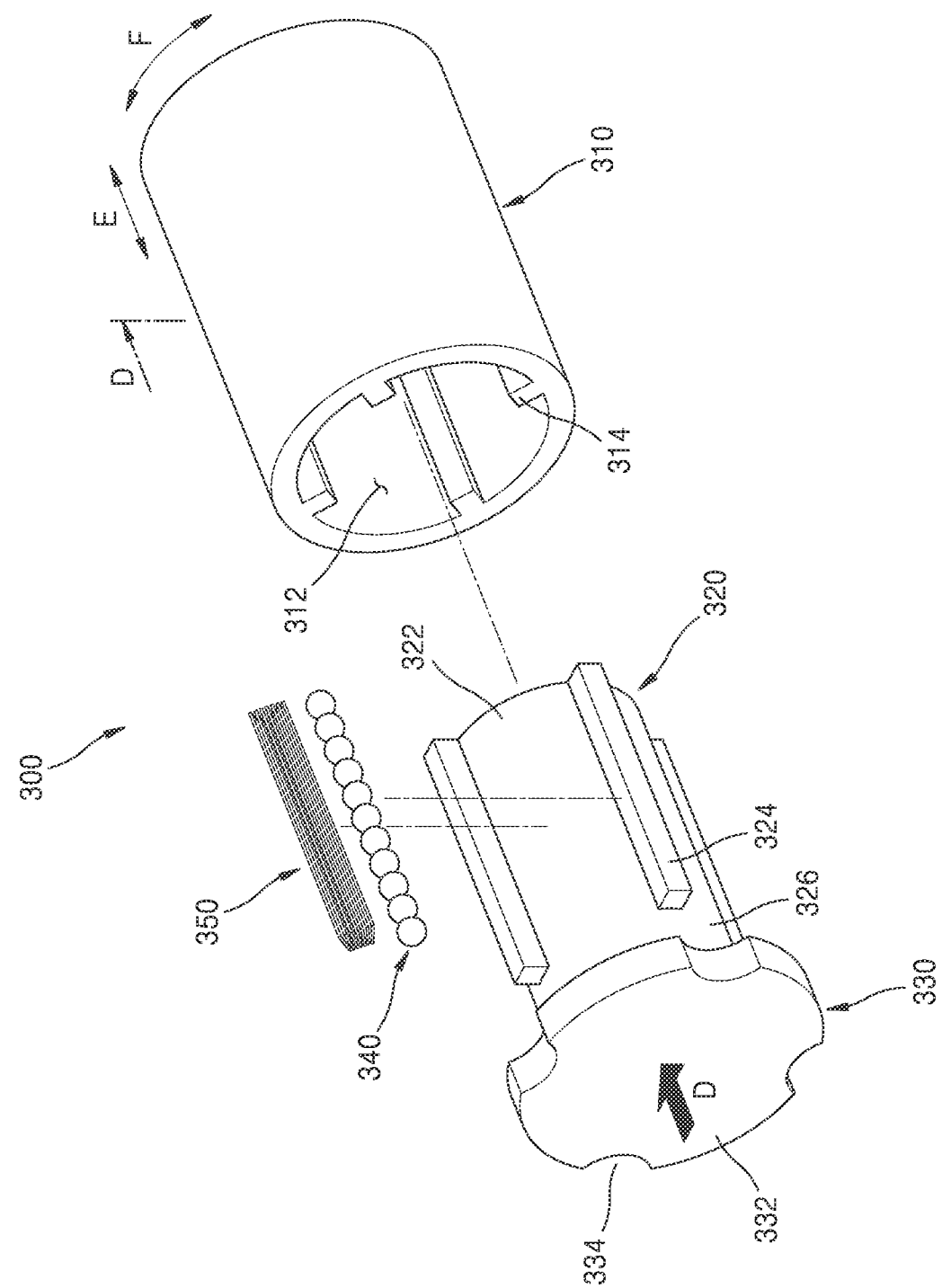
FIG. 6 is an exploded view illustrating a structure of a master unit of the engine including the displacement expanding apparatus according to an embodiment.
Figure 7:
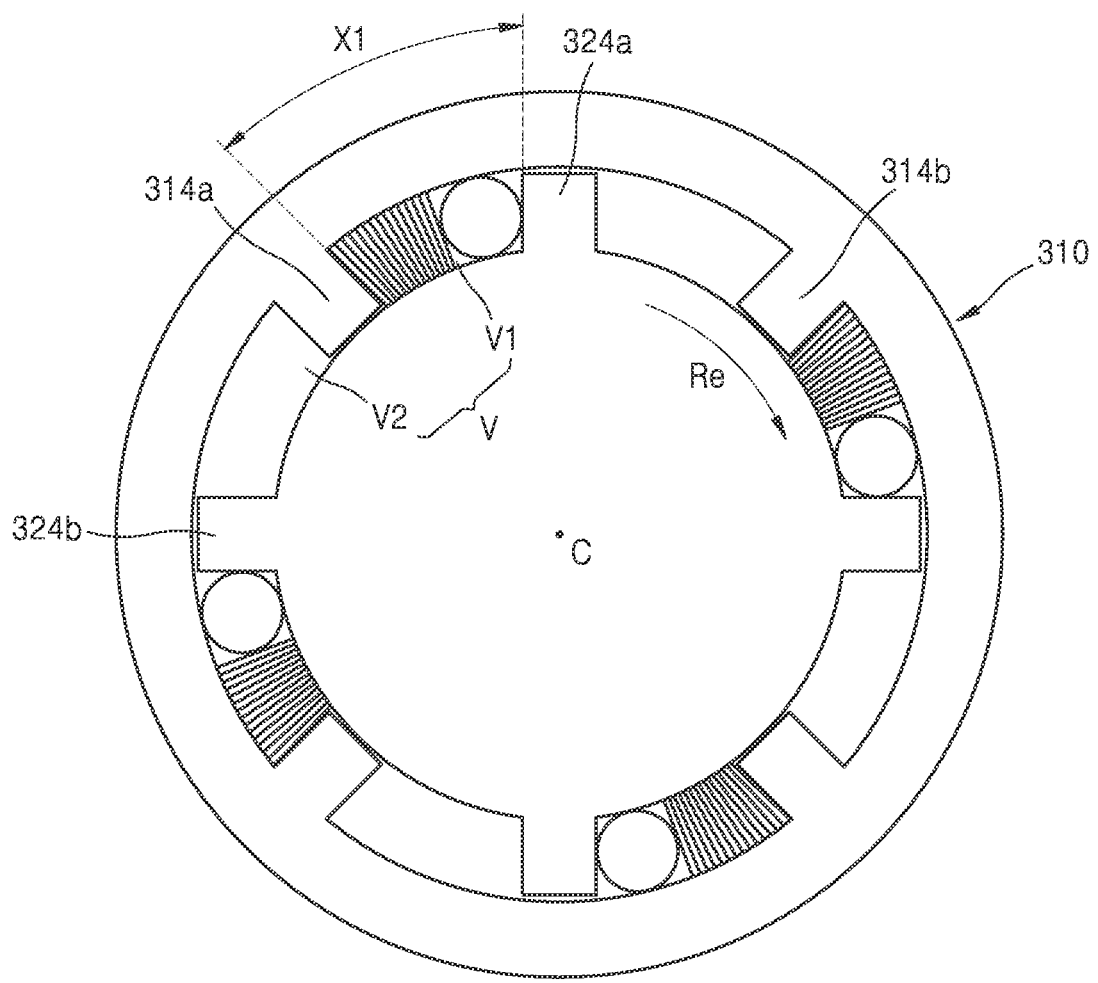
FIG. 7 is a cross-sectional view taken along line D-D of FIG. 6, illustrating an operation state of the master unit of the engine including the displacement expanding apparatus according to an embodiment.
Figure 8:
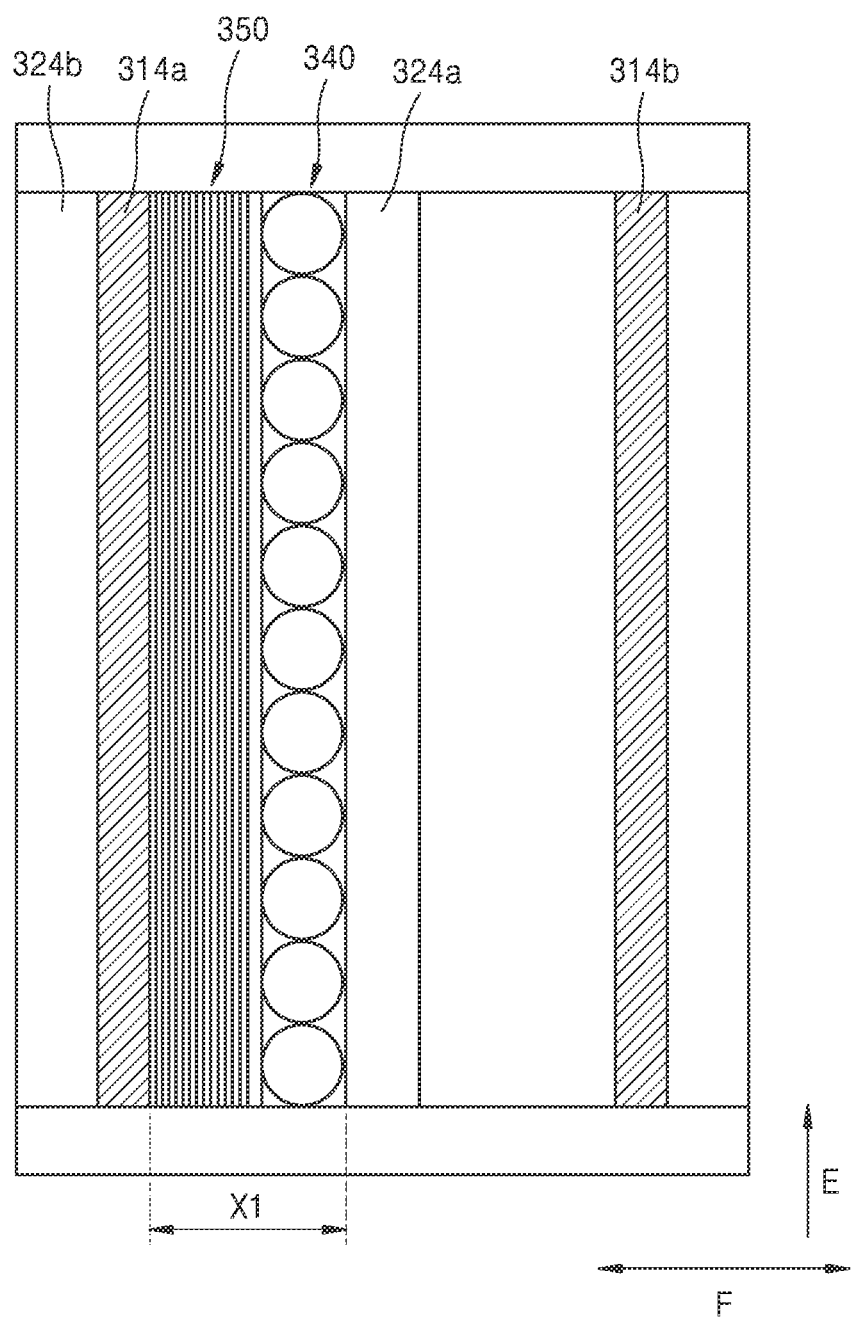
FIG. 8 is a view in which structures of a first protruding vane and a second protruding vane, and an elastic panel member and an elastic ball which are between the first protruding vane and the second protruding vane are unfolded in the direction of an arrow F of FIG. 7 when the master unit of the engine including the displacement expanding apparatus according to an embodiment is in the operation state of FIG. 7.
Figure 9:
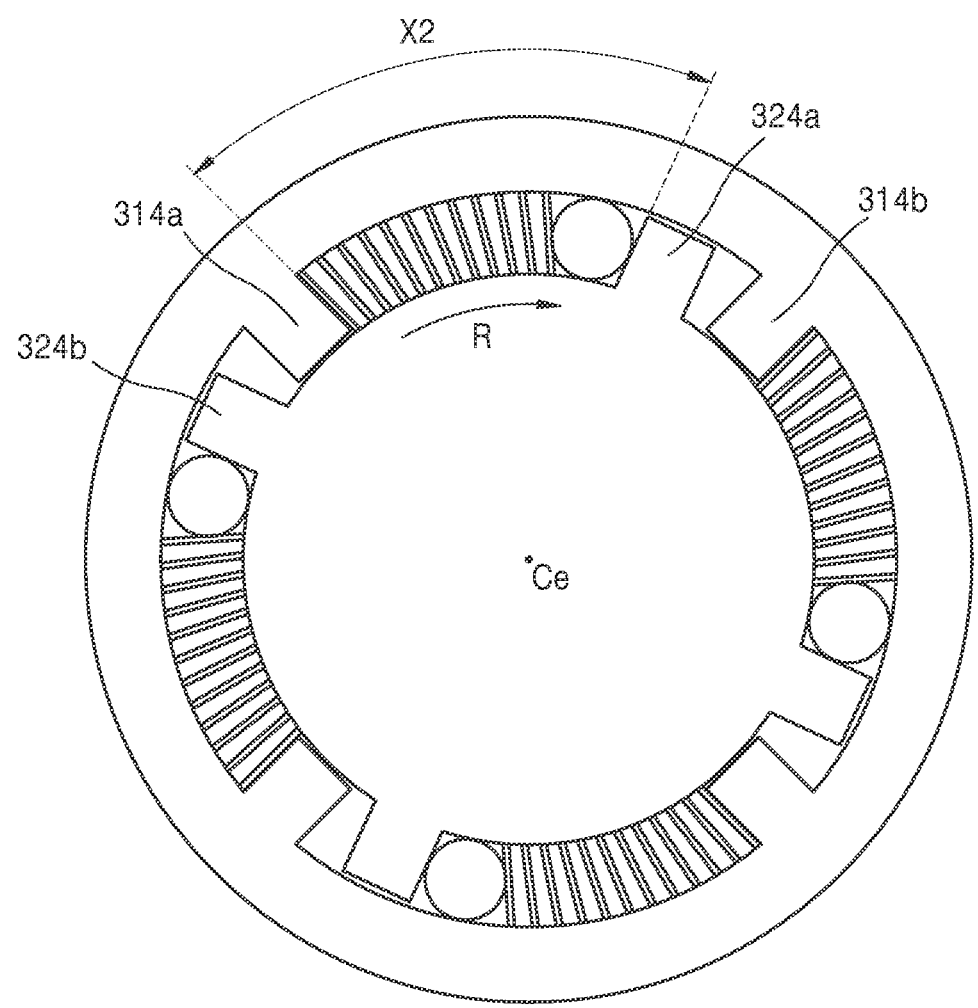
FIG. 9 is a cross-sectional view taken along line D-D of FIG. 6, illustrating an operation state of the master unit of the engine including the displacement expanding apparatus according to an embodiment.
Figure 10:
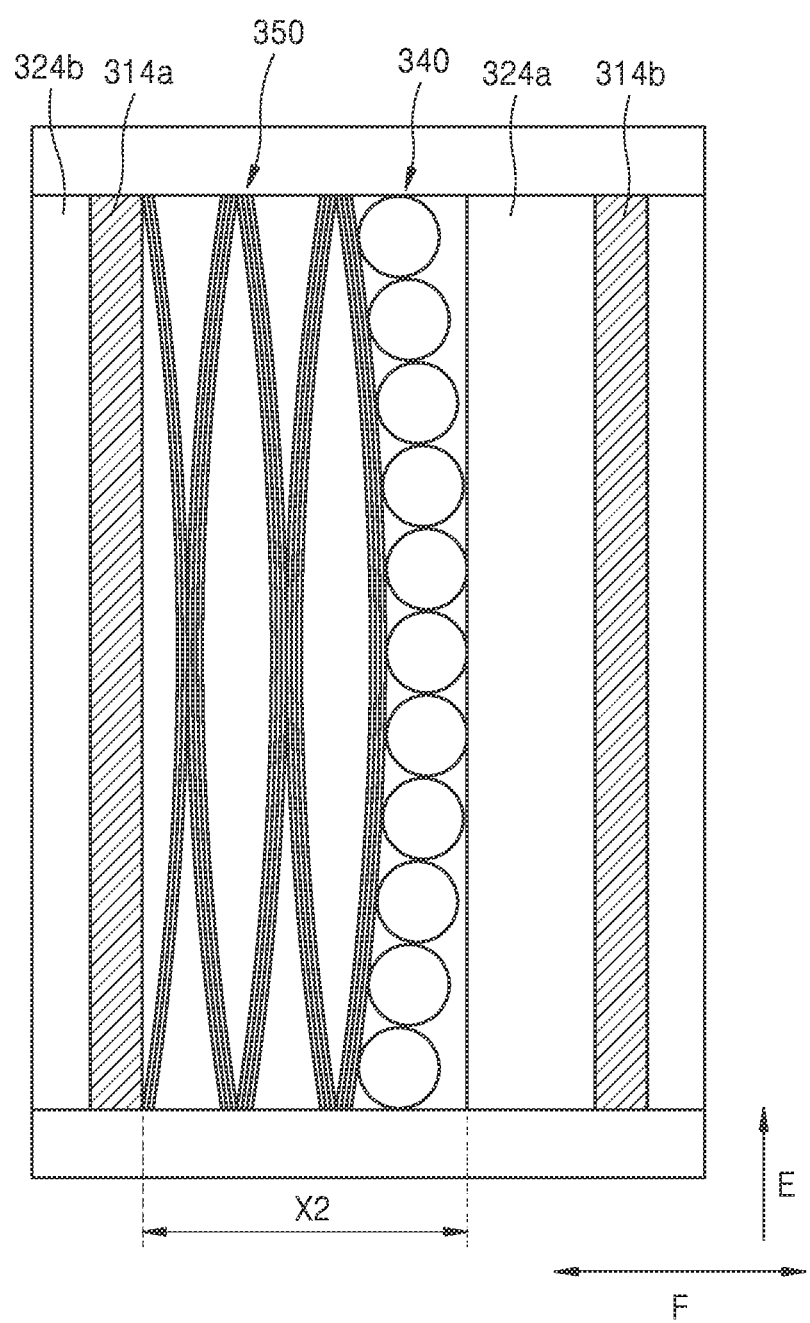
FIG. 10 is a view in which structures of the first protruding vane and the second protruding vane, and the elastic panel member and the elastic ball, which are between the first protruding vane and the second protruding vane, are unfolded in the direction of the arrow F of FIG. 7 when the master unit of the engine including the displacement expanding apparatus according to an embodiment is in the operation state of FIG. 9.

FIG. 6 is an exploded view illustrating a structure of the master unit 300 of the engine 1 including the displacement expanding apparatus according to an embodiment. FIG. 7 is a cross-sectional view taken along line D-D of FIG. 6, illustrating that an operation state of the master unit 300 of the engine 1 including the displacement expanding apparatus according to an embodiment is viewed in a direction D. FIG. 8 is a view in which structures of a first protruding vane 314 and a second protruding vane 324, and an elastic panel member 350 and an elastic ball 340 which are between the first protruding vane 314 and the second protruding vane 324 are unfolded in the direction of an arrow F of FIG. 7 when the master unit 300 of the engine 1 including the displacement expanding apparatus according to an embodiment is in the operation state of FIG. 7. FIG. 9 is a cross-sectional view taken along line D-D of FIG. 6, illustrating that an operation state of the master unit 300 of the engine 1 including the displacement expanding apparatus according to an embodiment is viewed in the direction D. FIG. 10 is a view in which structures of the first protruding vane 314 and the second protruding vane 324, and the elastic panel member 350 and the elastic ball 340, which are between the first protruding vane 314 and the second protruding vane 324, are unfolded in the direction of the arrow F of FIG. 7 when the master unit 300 of the engine 1 including the displacement expanding apparatus according to an embodiment is in the operation state of FIG. 9.

Hereinafter, the configuration of the master unit 300 and the operation of the master unit 300 will be described. Here, the forward and backward directions are indicated as the directions of an arrow E. Also, the circumferential direction is indicated as the direction of an arrow F.

Also, as described above, the disc plate 230 is provided at the rear end of the master unit 300.

The master unit 300 is mounted within the casing 100 and located in front of the vibration unit 200.

The master unit 300 is a unit which receives vibration generated in the vibration unit 200 and transforms the linear reciprocation due to the vibration into reciprocating rotation.

The master unit 300 includes a swell tube 310, a swell rotor 320, a lift cam panel 330, an elastic ball 340, and an elastic panel member 350.

The swell tube 310 is a tube having a cavity 312. The swell tube 310 extends in the forward and backward directions with respect to the main central axis Ce. The swell tube 310 is fixed at a position within the casing 100. The cavity 312 of the swell tube 310 extends having the same central axis with the main central axis Ce. The cavity 312 is open in the forward and backward directions. Each of first protruding vanes 314 is provided on the inner circumferential surface of the swell tube 310. The first protruding vane 314 protrudes inward in the radial direction of the swell tube 310 and extends in the forward and backward directions.

At least a portion of the swell rotor 320 is mounted within the cavity 312 of the swell tube 310. The swell tube 320 has the same central axis as the main central axis Ce and extends in the forward and backward directions. The swell rotor 320 is located within the cavity of the swell tube 310.

The swell rotor 320 has a cylindrical swell rotor body 322. A swell space V is defined between the swell rotor body 322 and the swell tube 310.

A second protruding vane 324 is provided on the outer circumferential surface of the swell rotor body 322. Each of second protruding vanes 324 protrudes outward in the radial direction of the swell rotor 320 and extends in the forward and backward directions. The swell space V is provided between the first protruding vane 314 and the second protruding vane 324. The swell space V may be filled with a fluid having insulating and cooling functions.

The rear end of the swell rotor 320 may face the disc plate 230 of the vibration unit 200. Here, there is a spaced distance between the rear end of the swell rotor 320 and the disc plate 230.

The swell rotor 320 is located within the cavity 312 of the swell tube 310 and may rotate within the central angle of a certain range.

Each of elastic balls 340 is located between the first protruding vane 314 of the swell tube 310 and the second protruding vane 324 of the swell rotor 320. The elastic ball 340 may be an elastic ball 340 having an elastic restoring force.

The elastic panel member 350 includes a plurality of flat spring members which each are elastically deformed and restored. The elastic panel member 350 has a configuration in which the plurality of flat spring members are stacked. The elastic panel member 350 is located between the first protruding vane 314 of the swell tube 310 and the second protruding vane 324 of the swell rotor 320.

That is, the elastic panel member 350 and the elastic ball 340 are located within the swell space V.

Here, the elastic panel member 350 and the elastic ball 340 are not necessarily arranged in all swell spaces V between the first protruding vanes 314 and the second protruding vanes 324. That is, as illustrated in FIG. 7, a space (a first swell space V1) in which the elastic panel member 350 and the elastic ball 340 are arranged and a space (a second swell space V2) in which the elastic panel member 350 and the elastic ball 340 are not arranged are alternately provided.

As having the arrangement described above, the elastic panel member 350 and the elastic ball 340 may apply an elastic force in the circumferential direction of the swell rotor 320 (that is, in a direction in which the swell rotor 320 rotates with respect to the central axis) between the first protruding vane 314 and the second protruding vane 324.

The lift cam panel 330 is provided at the distal end of the swell rotor 320. The lift cam panel 330 and the swell rotor 320 may be integrally constituted, or coupled to each other and integrally fixed. A neck 326 may be provided at the distal end of the swell rotor 320 connected to the lift cam panel 330.

The lift cam panel 330 may include a disc body 332 with an approximately circular appearance and a lifting groove 334. The lift cam panel 330 may have the same central axis as the main central axis Ce. At least some portions of the lift cam panel 330 have diameters different from those of other portions thereof.

According to an embodiment, the lift cam panel 330 includes a plurality of lifting grooves 334. Each of the lifting grooves 334 is defined in the outer circumferential surface in the radial direction of the lift cam panel 330 and has a certain depth in the radial direction.

The operation of the master unit 300 will be described below. For convenience of description, only one first swell space V1 (a swell space in which the elastic panel member 350 and the elastic ball 340 are disposed between the first protruding vane 314 and the second protruding vane 324) is selected and described. Here, the first protruding vane 314 within the first swell space V1 is referred to as a first-1 protruding vane 314a, and the second protruding vane 324 is referred to as a second-1 protruding vane 324a. Also, the first protruding vane 314 and the second protruding vane 324 located outside the first swell space V1 are referred to as a first-2 protruding vane 314b and a second-2 protruding vane 324b, respectively. The first-2 protruding vane 314b and the second-2 protruding vane 324b are illustrated only for more clear confirmation.

The master unit 300 operates in association with the vibration unit 200.

In both an initial state in which the vibration unit 200 does not operate and an operation state in which the vibrator 210 of the vibration unit 200 is moved back, the swell tube 310, the swell rotor 320, the elastic panel member 350, and the elastic ball 340 of the master unit 300 have positional relationships as illustrated in FIG. 7 and FIG. 8. In addition, the distance between the first-1 protruding vane 314a and the second-1 protruding vane 324a within one first swell space V1 has a value of X1.

The vibration unit 200 is operated to vibrate the vibrator 210, and then the vibration ball 220 is displaced (vibrating) forward. Accordingly, the disc plate 230 pushes the elastic panel member 350 forward. Thus, the elastic panel member 350 is compressed and deformed as illustrated in FIG. 9 an FIG. 10. Thus, the distance between the first-1 protruding vane 314a and the second-1 protruding vane 324a is expanded to have a value of X2. Thus, the swell rotor 320 rotates in a direction in which the distance between the first-1 protruding vane 314a and the second-1 protruding vane 324a is expanded. Here, the width of the elastic panel member 350 which is deformed in the circumferential direction of the swell tube 320 may be about 0.5 mm to about 1 mm. The drawing may be somewhat exaggerated. However, an embodiment is not limited to the values described above.

In addition, the restoration of the swell rotor 320 may be achieved by the operations of the forward and backward reciprocating unit 400 and the rotation unit 500.

Figure 11:
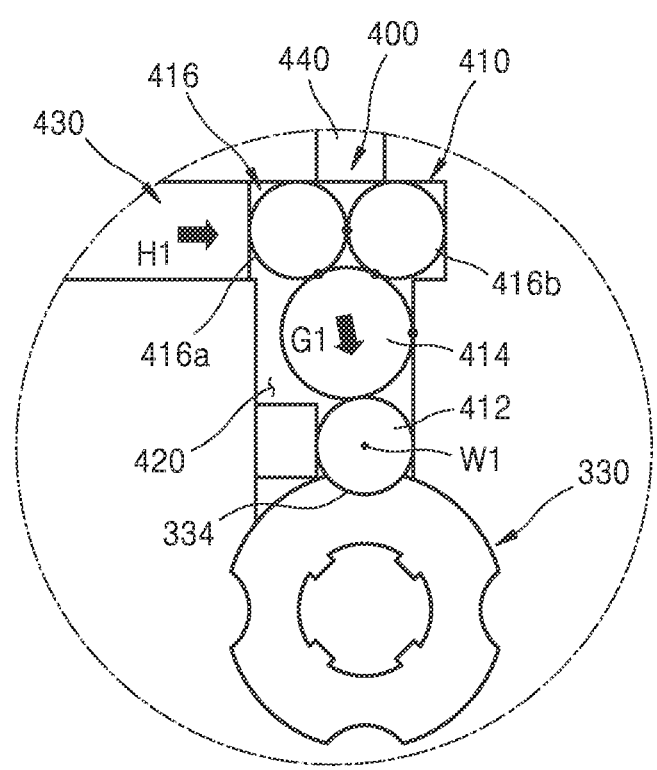
FIG. 11 is a conceptual view in which structures of a lift cam panel of the master unit and a forward and backward reciprocating unit when the master unit of the engine including the displacement expanding apparatus according to an embodiment is in the operation state of FIG. 7.
Figure 12:
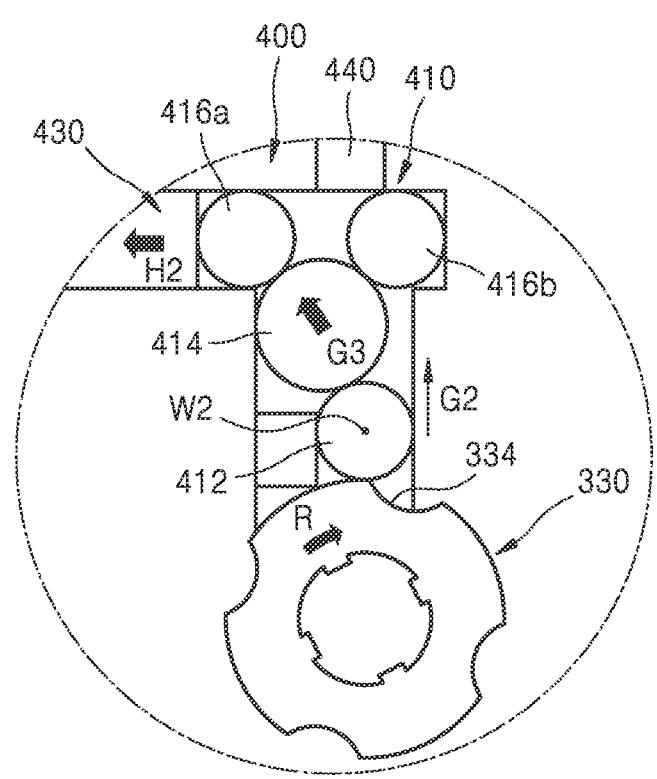
FIG. 12 is a conceptual view in which structures of the lift cam panel of the master unit and the forward and backward reciprocating unit when the master unit of the engine including the displacement expanding apparatus according to an embodiment is in the operation state of FIG. 9.
Figure 13:
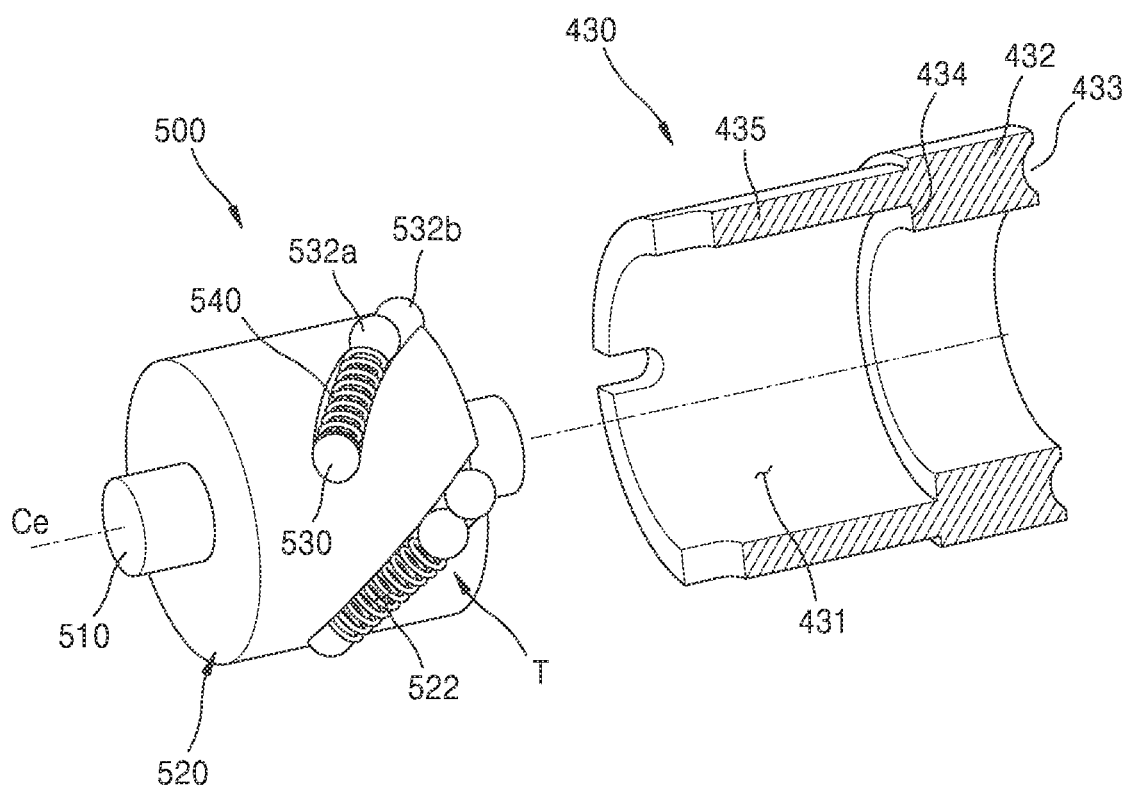
FIG. 13 is a structural view illustrating a coupling relationship between a pushing cylinder of the forward and backward reciprocating unit and the rotation unit.

FIG. 11 is a conceptual view in which structures of the lift cam panel 330 of the master unit 300 and the forward and backward reciprocating unit 400 when the master 300 unit of the engine 1 including the displacement expanding apparatus according to an embodiment is in the operation state of FIG. 7. FIG. 12 is a conceptual view in which structures of the lift cam panel 330 of the master unit 300 and the forward and backward reciprocating unit 400 when the master 300 unit of the engine 1 including the displacement expanding apparatus according to an embodiment is in the operation state of FIG. 9. For convenience of explanation and confirmation, in FIGS. 11 and 12, the lift cam panel 330 is shown in the front-back direction. And, the frontward and backward reciprocating unit 400 is shown in the state seen from the side direction. Also, FIG. 13 is a structural view illustrating a coupling relationship between the pushing cylinder 430 of the forward and backward reciprocating unit 400 and the rotation unit 500.

Hereinafter, the configuration of the forward and backward reciprocating unit 400 and the operation of the forward and backward reciprocating unit 400 will be described.

The forward and backward reciprocating unit 400 includes a ball unit 410 and the pushing cylinder 430. The ball unit 410 includes a lift ball 412, a shift ball 416, and an intermediate ball 414. In addition, a mounting space 420 may be provided, in which each of the lift ball 412, the shift ball 416, and the intermediate ball 414 may be displaced (the mounting space 420 includes a vertical passage formed by extending the casing 100 in the radial direction).

As described above, four forward and backward reciprocating units 400 may be provided respectively in the four directions around the main central axis Ce. Thus, four mounting spaces 420 may be provided respectively in the four directions around the main central axis Ce.

The lift ball 412 may be located in the outside of the lift cam panel 330 in the radial direction. The lift ball 412 may be located in contact with the outer circumferential surface of the lift cam panel 300 in the radial direction.

The shift ball 416 may be located further outward than the lift ball 412 in the radial direction of the casing 100. According to an embodiment, two shift balls 416 may be provided within each of the forward and backward reciprocating units 400. Thus, a first shift ball 416a located in a front region and a second shift ball 416b located in a rear region may be provided.

The intermediate ball 414 may be located between the lift ball 412 and the shift ball 416 in the radial direction. The intermediate ball 414 may be located between the first shift ball 416a and the second shift ball 416b in the forward and backward directions.

Here, the lift ball 412 and the shift ball 416 may have the same size. In addition, the intermediate ball 414 has the size greater than that of each of the lift ball 412 and the shift ball 416, which may expand the movement distance of the first shift ball 416 in the forward and backward direction according to the movement of the intermediate ball 414 in the radial direction.

The pushing cylinder 430 may be made of a certain tubular member having a cylinder cavity 431. The pushing cylinder 430 include a cylinder body 432. A rear pushing surface 433 and a front pushing surface 434 are provided on the rear surface and the front surface of the cylinder body 432, respectively. In addition, the pushing cylinder 430 may have an extension tube 435 that extends further forward than the front pushing surface 434.

The rear pushing surface 433 is a portion which is located in front of the shift ball 416 and may be normally in compressive and close contact with the shift ball 416.

The front pushing surface 434 is a portion located in front of the rear pushing surface 433.

The cooling insulating oil may be filled into the mounting space 420. The cooling insulating oil may be suppled from a cooling oil chamber 110 within the casing 100. Accordingly, the mounting space 420 may have a certain passage 440 that communicates with the cooling oil chamber 110.

The operation of the forward and backward reciprocating unit 400 will be described below.

First, the forward and backward reciprocating unit 400 operates in association with the master unit 300.

When the lift ball 412 is located in contact with the inside of the lifting groove 334 of the lift cam panel 330 of the master unit 300, the lift ball 412 is located at a first position W1 as illustrated in FIG. 11.

Also, the lift cam panel 330 rotates in a direction of an arrow R, and the lift ball 412 is separated from the lifting groove 334 of the lift cam panel 330 and is located in contact with the outer circumferential surface of the lift cam panel 330. Thus, the lift ball 412 is lifted in a direction of an arrow G2 and is located at a second position W2 illustrated in FIG. 12. The intermediate ball 414 also rises as indicated by arrow G3.

Here, the second position W2 is a position further outward than the first position W1 in the radial direction. Thus, when the lift cam panel 330 reciprocatingly rotates, the lifting groove 334 reciprocatingly rotates. Thus, the lift ball 412 reciprocates in the radial direction of the casing 100 between the first position W1 and the second position W2.

As the lift ball 412 reciprocates in the radial direction of the casing 100, the intermediate ball 414 also reciprocates in the radial direction of the casing 100.

The shift ball 416 (clearly, the first shift ball 416a) is pushed by the lift ball 412 and displaced forward in a direction of an arrow H of FIG. 12 when the lift ball 412 is located at the second position W2. At this time, the intermediate ball 414 is displaced in the diagonal direction as shown by the arrow G3 of FIG. 12. Here, the shift ball 416 pushes forward the rear pushing surface 433 of the pushing cylinder 430 as shown by the arrow H2. Thus, the pushing cylinder 430 is displaced forward.

During this procedure, the width of displacement of the pushing cylinder 430 in the forward and backward directions becomes larger than the width of vibration of the vibrator 210.

Also, the rearward displacement of the shift ball 416 and the inward restoration of the position of the lift ball 412 in the radial direction are related to the operation of the following rotation unit 500 and thus described later.

Figure 14:
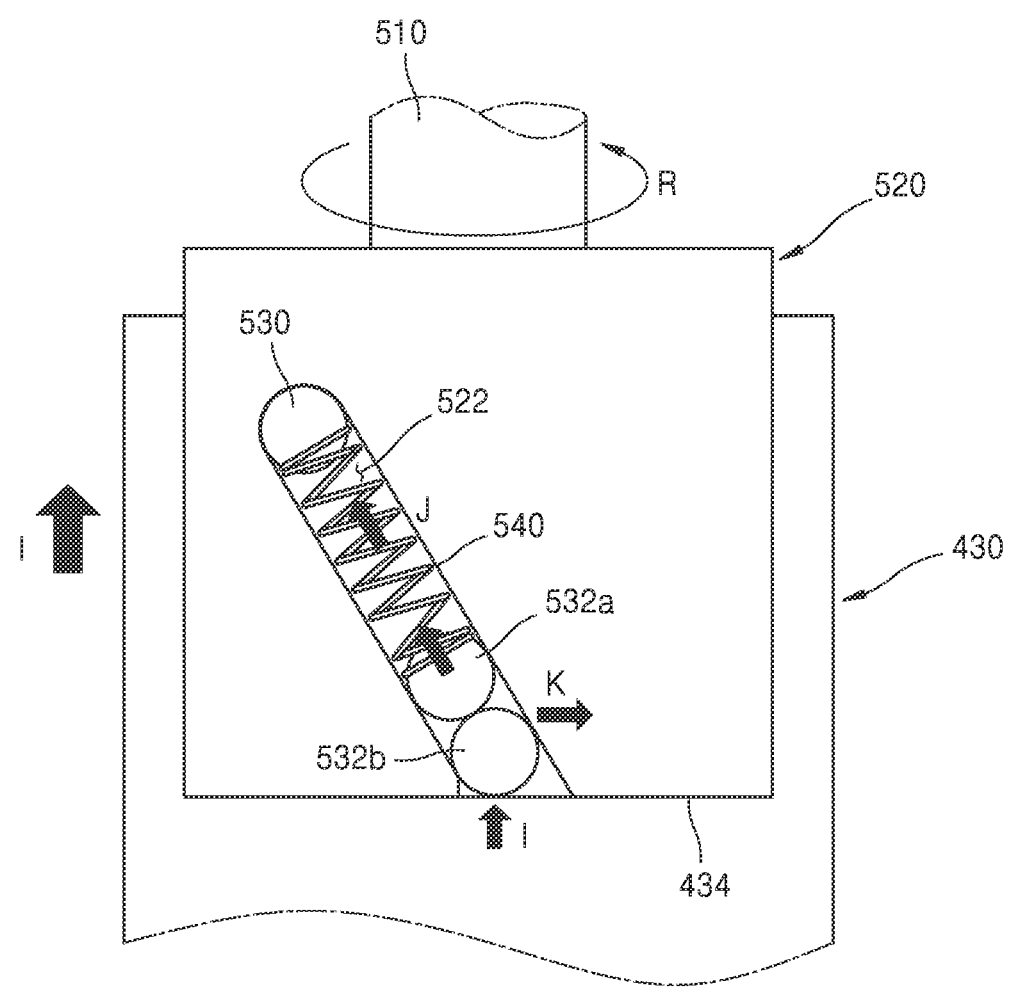
FIG. 14 and FIG. 15 are views illustrating an operational relationship between the pushing cylinder of the forward and backward reciprocating unit and the rotation unit.
Figure 15:
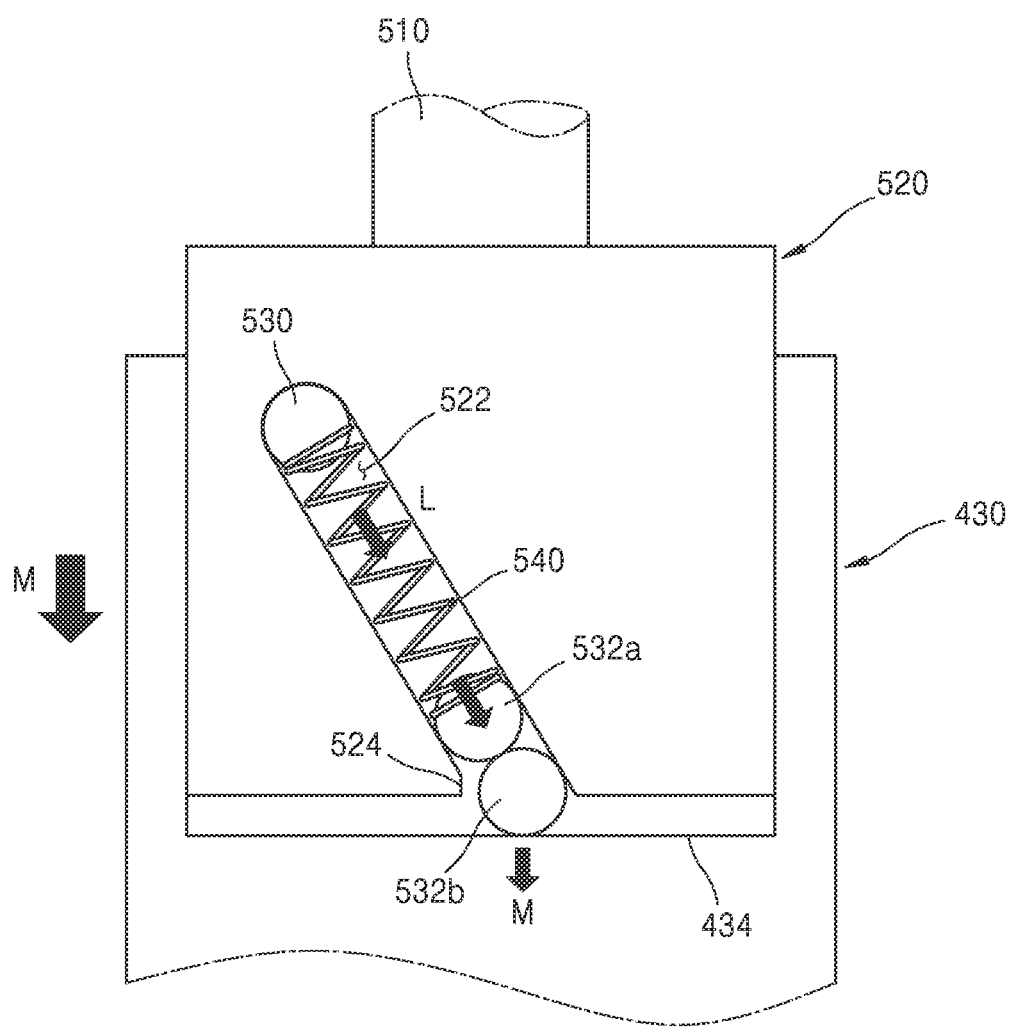

FIG. 13 is a structural view illustrating a coupling relationship between the pushing cylinder 430 of the forward and backward reciprocating unit 400 and the rotation unit 500. FIG. 14 and FIG. 15 are views illustrating an operational relationship between the pushing cylinder 430 of the forward and backward reciprocating unit 400 and the rotation unit 500.

Hereinafter, the rotation unit 500 will be described.

The rotation unit 500 is a unit which is mounted within the casing 100, is located at the front end of the casing 100, and rotates with respect to the central axis due to the linear forward and backward reciprocation of the forward and backward reciprocating unit 400.

The rotation unit 500 includes a rotor shaft 510, a main rotor 520, and a sliding module T.

The rotor shaft 510 is a rotation shaft which shares the central rotation axis with the main central axis Ce.

The main rotor 520 is a rotor which is connected to the rotor shaft 510 and rotates. The main rotor 520 may be located within the cavity 431 of the pushing cylinder 430 of the forward and backward reciprocating unit 400 (clearly, inside the extension tube 435). Thus, the outer circumferential surface of the main rotor 520 may be in contact with the inner surface of the extension tube 435 of the pushing cylinder 430. In addition, the rear surface of the main rotor 520 may be in contact with the front pushing surface 434 of the pushing cylinder 430 in the forward and backward directions.

The main rotor 520 may have a module mounting groove 522. The module mounting groove 522 is defined in the outer circumferential surface of the main rotor 520, open rearward, and inclined relative to the main central axis Ce. That is, the module mounting groove 522 is defined in a spiral shape. The module mounting groove 522 is defined in the outer circumferential surface of the main rotor 520 and may be defined in each of four directions. The rear end of the module mounting groove 522 has a chamfered hole 524.

The sliding module T is mounted within the module mounting groove 522.

The sliding module T includes a first rotor driving ball 530, an elastic spring 540, and a second rotor driving ball 532.

The first rotor driving ball 530 is located at the front end of the module mounting groove 522. The elastic spring 540 is located behind the first rotor driving ball 530. The second rotor driving ball is located behind the elastic spring 540. The second rotor driving ball 532 may include a second-1 rotor driving ball 532a and a second-2 rotor driving ball 532b. The second-2 rotor driving ball 532b protrudes further rearward than the rear surface of the main rotor 520 and thus may be exposed.

The operation of the rotation unit 500 will be described below.

The rotation unit 500 operates in association with the forward and backward reciprocating unit 400.

As described above, the pushing cylinder 430 of the forward and backward reciprocating unit 400 may be displaced forward by the shift ball. Here, when the pushing cylinder 430 is displaced forward, the front pushing surface 434 provided in the pushing cylinder 430 pushes the second rotor driving ball 532 forward.

The second rotor driving ball 532, which is pushed forward in a direction of an arrow I, pushes an inclined surface of the module mounting groove 522 of the main rotor 520. Thus, a component force in a direction of an arrow K in which the main rotor 520 rotates is generated. Thus, the main rotor 520 rotates.

When the second rotor driving ball 532 is pushed forward and displaced, the second rotor driving ball 532 is displaced in a forward inclined direction along the module mounting groove 522. Thus, the elastic spring 540 is compressed in a direction of an arrow J.

Subsequently, when the compressed elastic spring 540 is restored by an elastic restoring force in a direction of an arrow L, the second rotor driving ball 532 returns again in a rearward inclined direction along the module mounting groove 522.

When the second rotor driving ball 532 is displaced rearward and brought into close contact with the front pushing surface 434 of the pushing cylinder 430 to apply a compressive force thereto in a direction of an arrow M, the position of the pushing cylinder 430 is restored rearward again in a direction of the arrow M. Here, the rear pushing surface 433 of the pushing cylinder 430 pushes the shift ball rearward.

The shift ball, which is pushed rearward, pushes the intermediate ball 414 and the lift ball 412 downward. Thus, as the lift ball 412 is pushed downward (downward direction in the drawing or the direction toward the central axis with respect to the central axis), the lift ball 412 is located again at the first position W1. That is, the pushing cylinder 430 displaces like arrow H1 shown in FIG. 11, and the intermediate ball 414 displaces like arrow G1.

Also, as the lift ball 412 is pushed rearward, the lift cam panel 330 is also restored again to the original position thereof. In addition, the swell rotor 320 is also restored to the original position thereof.

Hereinafter, the operations of the engine 1 including the displacement expanding apparatus according to an embodiment are described sequentially.

When the vibrator 210 generates reciprocating vibration in the forward and backward directions, the vibration may be transmitted to the disc plate 230 through the head 212 and the vibration ball 220. Thus, the entirety of the disc plate 230 may be reciprocated in the forward and backward directions. Alternatively, at least a portion thereof may be deformed and reciprocated in the forward and backward directions.

When the disc plate 230 pushes forward the elastic panel member 350, the elastic panel member 350 is compressed and deformed. Thus, the swell rotor 320 rotates in a direction in which the distance between the first protruding vane 314 and the second protruding vane 324 is expanded. Here, the lift cam panel 330 rotates together.

When the lift cam panel 330 rotates, the lift ball 412 of the forward and backward reciprocating unit 400, which is located within the lifting groove 334 of the lift cam panel 330, moves from the first position W1 to the second position W2. That is, the lift ball 412 moves outward in the radial direction of the casing 100.

As the lift ball 412 moves outward in the radial direction of the casing 100, the intermediate ball 414 also moves outward in the radial direction of the casing 100.

The shift ball 416 (clearly, the first shift ball 416a) is pushed by the lift ball 412 and displaced forward when the lift ball 412 is located at the second position W2 (that is, when moving outward in the radial direction of the casing 100). Here, the shift ball pushes forward the rear pushing surface 433 of the pushing cylinder 430. Thus, the pushing cylinder 430 is displaced forward.

When the pushing cylinder 430 is displaced forward, the front pushing surface 434 provided in the pushing cylinder 430 pushes forward the second rotor driving ball 532 of the rotation unit 500.

The second rotor driving ball 532, which is pushed forward, pushes the inclined surface of the module mounting groove 522 of the main rotor 520, and thus the main rotor 520 rotates.

When the second rotor driving ball 532 is pushed forward and displaced, the elastic spring 540 is compressed. When the compressed elastic spring 540 is restored by the elastic restoring force, the second rotor driving ball 532 returns again in the rearward inclined direction along the module mounting groove 522.

When the second rotor driving ball 532 is displaced rearward and pushes the front pushing surface 434 of the pushing cylinder 430 while being brought into close contact therewith, the position of the pushing cylinder 430 is restored rearward again. Here, the pushing cylinder 430 pushes the shift ball 416 rearward. The shift ball 416, which is pushed rearward, pushes downward the intermediate ball 414 and the lift ball 412.

The operations described above are continuously repeated as the vibrator 210 vibrates.

Hereinafter, the effects of the engine 1 including the displacement expanding apparatus according to an embodiment will be described.

The engine 1 including the displacement expanding apparatus according to an embodiment includes the ceramic vibrator 210 that constitutes the engine 1 including the displacement expanding apparatus, and the ceramic vibrator 210 mainly utilizes a reverse piezoelectric effect. According to the reverse piezoelectric effect, the displacement and a large force are generated in the ceramic vibrator 210 on the basis of a driving voltage, a driving frequency, and rigidity of the ceramic vibrator 210, and the torque for rotating the rotor may be made large. In particular, vibrations and outputs by the vibrations may be arbitrarily changed by adjusting a time for supplying an applied driving signal.

Also, the engine 1 including the displacement expanding apparatus according to an embodiment includes amplitude expanding apparatuses (the master unit 300, the forward and backward reciprocating unit 400, and the rotation unit 500) which may expand the amplitude of vibration, and thus the amplitude of vibration by the vibrator 210 may be further expanded. Accordingly, larger outputs may be obtained.

In addition, the engine 1 including the displacement expanding apparatus according to an embodiment includes: the cooling oil chamber 110 filled with the cooling oil; and the flow passage through which the cooling oil flows. Thus, the heat generated during the operations may be efficiently removed.

The displacement expanding apparatus according to an embodiment may amplify the external vibration and transform to the rotation.

The engine including the displacement expanding apparatus according to an embodiment includes the ceramic vibrator, and the ceramic vibrator mainly utilizes the reverse piezoelectric effect. According to the reverse piezoelectric effect, the displacement and the large force are generated in the ceramic vibrator 210 on the basis of the driving voltage, the driving frequency, and the rigidity of the ceramic vibrator, and the torque for rotating the rotor may be made large. In particular, the vibrations and outputs by the vibrations may be arbitrarily changed by adjusting the time for supplying the applied driving signal.

Also, the engine including the displacement expanding apparatus according to an embodiment includes the amplitude expanding apparatuses (the master unit, the forward and backward reciprocating unit, and the rotation unit) which may expand the amplitude of vibration, and thus the amplitude of vibration by the vibrator may be further expanded. Accordingly, the larger outputs may be obtained.

In addition, the engine including the displacement expanding apparatus according to an embodiment includes the cooling oil chamber filled with the cooling oil. Thus, the heat generated during the operations may be efficiently removed.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A displacement expanding apparatus, the apparatus comprising:
    a master unit reciprocatingly rotating within a central angle of a certain magnitude with respect to a main central axis; and
    a forward and backward reciprocating unit located laterally to the outside of the master unit, at least a portion of the forward and backward reciprocating unit receiving the reciprocating rotation of the master unit and linearly reciprocating in forward and backward directions,
    wherein the master unit comprises:
    a swell tube extending in the forward and backward directions with respect to the main central axis and comprising a cavity having the same central axis as the main central axis;
    a swell rotor extending in the forward and backward directions with respect to the main central axis, at least a portion of the swell rotor being mounted within the cavity;
    an elastic ball mounted within the cavity and located between the swell tube and the swell rotor;
    an elastic panel member mounted within the cavity, located between the swell tube and the swell rotor, and located on a side portion of the elastic ball in a circumferential direction of the swell rotor;
    a disc plate arranged behind the swell tube and the swell rotor, wherein the disc plate vibrates in the forward and backward directions due to external vibration, thereby causing elastic deformation of the elastic panel member; and a lift cam panel arranged in front of the swell tube and the swell rotor and reciprocatingly rotating within a central angle of a certain magnitude with respect to the main central axis, wherein the forward and backward reciprocating unit comprises:

a ball unit of which at least a portion is in contact with the lift cam panel; and a pushing cylinder of which at least a portion is in contact with the ball unit, wherein at least a portion of the ball unit is reciprocated in a radial direction of the lift cam panel by reciprocating rotation of the lift cam panel, and at least another portion of the ball unit is reciprocated in the forward and backward directions, wherein the pushing cylinder is linearly reciprocated in the forward and backward directions by linear forward and backward reciprocation of the ball unit, wherein the swell tube comprises a first protruding vane provided on an inner circumferential surface in the radial direction, protruding inward in the radial direction, and extending in the forward and backward directions, wherein the swell rotor comprises a second protruding vane provided on an outer circumference in the radial direction, protruding outward in the radial direction, and extending in the forward and backward directions, wherein the lift cam panel is deformed by the vibration of the disc plate, wherein the elastic panel member is elastically deformed and restored in the circumferential direction of the swell rotor between the first protruding vane and the second protruding vane to change a distance between the first protruding vane and the second protruding vane.

2. The apparatus of claim 1, wherein the elastic panel member
comprises a plurality of flat spring members stacked in a direction between the first protruding vane and the second protruding vane and
applies an elastic force between the first protruding vane and the second protruding vane.

3. The apparatus of claim 2, wherein the lift cam panel comprises a plurality of lifting grooves defined in an outer circumferential surface of the lift cam panel in the radial direction and having a certain depth in the radial direction.

4. The apparatus of claim 3, wherein the ball unit further comprises:
a lift ball located in contact with the outer circumferential surface of the lift cam panel in the radial direction; and
a shift ball located further outward than the lift ball in the radial direction of the lift cam panel,
wherein the pushing cylinder has:
a rear pushing surface in contact with the shift ball, at least portion of the rear pushing surface being located in front of the shift ball; and
a front pushing surface located in front of the rear pushing surface,
wherein the lift ball
is located at a first position when located within each of the lifting grooves of the lift cam panel and
is located at a second position when separated from each of the lifting grooves of the lift cam panel, wherein the second position is a position located further outward than the first position in the radial direction of the lift cam panel, and the lift ball reciprocates in the radial direction of the lift cam panel as the lift cam panel reciprocatingly rotates, wherein the shift ball
is pushed by the lift ball and displaced forward when the lift ball is located at the second position, thereby pushing forward the rear pushing surface of the pushing cylinder, and
the pushing cylinder is pushed forward by the shift ball and displaced.

5. The apparatus of claim 4, wherein, between the lift ball and the shift ball, an intermediate ball is provided, the intermediate ball being located further outward than the lift ball in the radial direction of the lift cam panel.

6. The apparatus of claim 5, further comprising a rotation unit, wherein the rotation unit comprises:
a rotor shaft sharing a central rotation axis with the main central axis;
a main rotor which is connected to the rotor shaft and rotates; and
a sliding module provided on an outer circumferential surface of the main rotor,
wherein the main rotor has a module mounting groove which is defined in the outer circumferential surface of the main rotor, open rearward, and inclined relative to the main central axis,
wherein the sliding module comprises:
a first rotor driving ball located at a front end of the module mounting groove;
an elastic spring located behind the first rotor driving ball; and
a second rotor driving ball located behind the elastic spring,
wherein the second rotor driving ball
is pushed forward by the front pushing surface of the pushing cylinder and pushed backward by the elastic spring,
thereby reciprocatingly displacing within the module mounting groove.

7. An engine comprising a displacement expanding apparatus, the engine comprising:
a casing having a main central axis that extends in one direction and having a mounting space therein;
a vibration unit mounted within the casing, located at a rear end of the casing, and comprising a vibrator configured to generate vibration that reciprocates in forward and backward directions, wherein the vibrator is connected to an external controller and the vibrator is operated by receiving a signal and/or power from the external controller;
a master unit mounted within the casing, positioned at a front end of the vibration unit, and receiving the vibration generated in the vibration unit, at least a portion of the master unit reciprocatingly rotating within a central angle of a certain magnitude with respect to the main central axis;
a forward and backward reciprocating unit mounted within the casing and located outside the master unit in a radial direction of the casing, at least a portion of the forward and backward reciprocating unit receiving the reciprocating rotation of the master unit and linearly reciprocating in forward and backward directions; and
a rotation unit mounted within the casing and located at a front end of the casing, at least a portion of the rotation unit receiving the linear forward and backward reciprocation of the forward and backward reciprocating unit and rotating with respect to the main central axis, wherein the master unit comprises a lift cam panel reciprocatingly rotating within a central angle of a certain magnitude with respect to the main central axis, wherein the forward and backward reciprocating unit comprises:

a ball unit of which at least a portion is reciprocated in the radial direction of the casing by the lift cam panel, at least a portion of the ball unit reciprocating in the forward and backward directions; and a pushing cylinder linearly reciprocating in the forward and backward directions, at least a portion of the pushing cylinder being in contact with the ball unit, wherein the rotation unit comprises:

a main rotor; and a sliding module of which at least a portion is displaced forward by the pushing cylinder to push the main rotor.

8. The engine of claim 7, wherein the vibration unit comprises:

a vibration ball located in front of the vibrator; and a disc plate located in front of the vibration ball and reciprocated in the forward and backward directions by the vibration ball.

9. The engine of claim 8, wherein the master unit comprises:

a swell tube extending in the forward and backward directions with respect to the main central axis and comprising a cavity having the same central axis as the main central axis;

a swell rotor extending in the forward and backward directions with respect to the main central axis, at least a portion of the swell rotor being mounted within the cavity;

an elastic ball mounted within the cavity and located between the swell tube and the swell rotor; and an elastic panel member mounted within the cavity, located between the swell tube and the swell rotor, and located outside the elastic ball, wherein the swell tube comprises a first protruding vane provided on an inner circumferential surface in a radial direction, protruding inward in the radial direction, and extending in the forward and backward directions, wherein the swell rotor comprises a second protruding vane provided on an outer circumference in the radial direction, protruding outward in the radial direction, and extending in the forward and backward directions, wherein the elastic ball and the elastic panel member are located between the first protruding vane and the second protruding vane, wherein the disc plate is located at a rear end of the elastic panel member and applies vibration to the elastic panel member in the forward and backward directions to elastically deform the elastic panel member, wherein the elastic panel member is elastically deformed and restored in a circumferential direction of the swell rotor between the first protruding vane and the second protruding vane to change a distance between the first protruding vane and the second protruding vane, wherein the lift cam panel is connected to a front end of the swell rotor and integrally constituted with the swell rotor.

10. The engine of claim 9, wherein the elastic panel member comprises a plurality of flat spring members stacked in a direction between the first protruding vane and the second protruding vane and applies an elastic force between the first protruding vane and the second protruding vane.

11. The engine of claim 10, wherein the lift cam panel comprises a plurality of lifting grooves defined in an outer circumferential surface in the radial direction and having a certain depth in the radial direction.

12. The engine of claim 11, wherein the ball unit further comprises:

a lift ball located in contact with the outer circumferential surface of the lift cam panel in the radial direction; and a shift ball located further outward than the lift ball in the radial direction of the casing, wherein the pushing cylinder has:

a rear pushing surface in contact with the shift ball, at least portion of the rear pushing surface being located in front of the shift ball; and a front pushing surface located in front of the rear pushing surface, wherein the lift ball is located at a first position when located within each of the lifting grooves of the lift cam panel and is located at a second position when separated from each of the lifting grooves of the lift cam panel, wherein the second position is a position located further outward than the first position in the radial direction of the casing, and the lift ball reciprocates in the radial direction of the casing as the lift cam panel reciprocatingly rotates, wherein the shift ball is pushed by the lift ball and displaced forward when the lift ball is located at the second position, thereby pushing forward the rear pushing surface of the pushing cylinder, and the pushing cylinder is pushed forward by the shift ball and displaced.

13. The engine of claim 12, wherein, between the lift ball and the shift ball, an intermediate ball is provided, the intermediate ball being located further outward than the lift ball in the radial direction of the casing.

14. The engine of claim 13, wherein the rotation unit comprises:

a rotor shaft sharing a central rotation axis with the main central axis;

a main rotor which is connected to the rotor shaft and rotates; and a sliding module provided on an outer circumferential surface of the main rotor, wherein the main rotor has a module mounting groove which is defined in the outer circumferential surface of the main rotor, open rearward, and inclined relative to the main central axis, wherein the sliding module comprises:

a first rotor driving ball located at a front end of the module mounting groove;

an elastic spring located behind the first rotor driving ball; and a second rotor driving ball located behind the elastic spring, wherein the second rotor driving ball is pushed forward by the front pushing surface of the pushing cylinder and pushed backward by the elastic spring, thereby reciprocatingly displacing within the module mounting groove.

15. The engine of claim 8, wherein within the casing, a cooling oil chamber is provided, the cooling oil chamber being filled with cooling insulating oil.

* * * * *